United States Patent [19]
Engel

[11] 3,927,527
[45] Dec. 23, 1975

[54] MECHANICAL MULTIPLIER-DESIGN II
[75] Inventor: William Karl Engel, Peoria, Ill.
[73] Assignee: Caterpillar Tractor Co., Peoria, Ill.
[22] Filed: Jan. 17, 1975
[21] Appl. No.: 541,818

[52] U.S. Cl. .................... 60/427; 60/486; 60/487; 74/471 R
[51] Int. Cl.² ........................................ F16H 39/46
[58] Field of Search ............ 60/420, 427, 486, 487; 74/471 R, 478.5, 484

[56] References Cited
UNITED STATES PATENTS

| | | | |
|---|---|---|---|
| 1,773,794 | 8/1930 | Schneider | 60/392 X |
| 3,381,472 | 5/1968 | Brown et al. | 60/325 |
| 3,477,225 | 11/1969 | Cryder et al. | 60/433 |
| 3,826,097 | 7/1974 | Tonc | 60/420 X |

*Primary Examiner*—Edgar W. Geoghegan
*Attorney, Agent, or Firm*—Phillips, Moore, Weissenberger Lempio & Strabala

[57] ABSTRACT

A mechanical multiplier assembly for controlling the displacement and direction of a pair of hydrostatic drive pumps for driving and steering a track type vehicle includes a flat rotational member having an elongated slot formed therein which is operable by a primary directional control linkage to rotate the member and the elongated slot provided therein. A first pair of sliding blocks, which also have elongated slots provided therein, are operable by means of the vehicle steering controls to reciprocate in a first direction parallel to the plane of rotation of the rotating member. A second pair of sliding blocks, having elongated slots provided therein, are connected to linkage controlling the displacement of the vehicle pumps and slidable in a second direction normal to the direction of sliding of the first pair of sliding blocks and parallel to the plane of rotation of the rotational member. Pin assemblies mutually disposed in the elongated slots in a first sliding block, a second sliding block, and the rotating member at the intersection thereof follow the intersections of the slots in the input members as they are moved, in turn moving the output members.

Another embodiment of the invention comprises two rotating input members and a single sliding input member.

6 Claims, 10 Drawing Figures

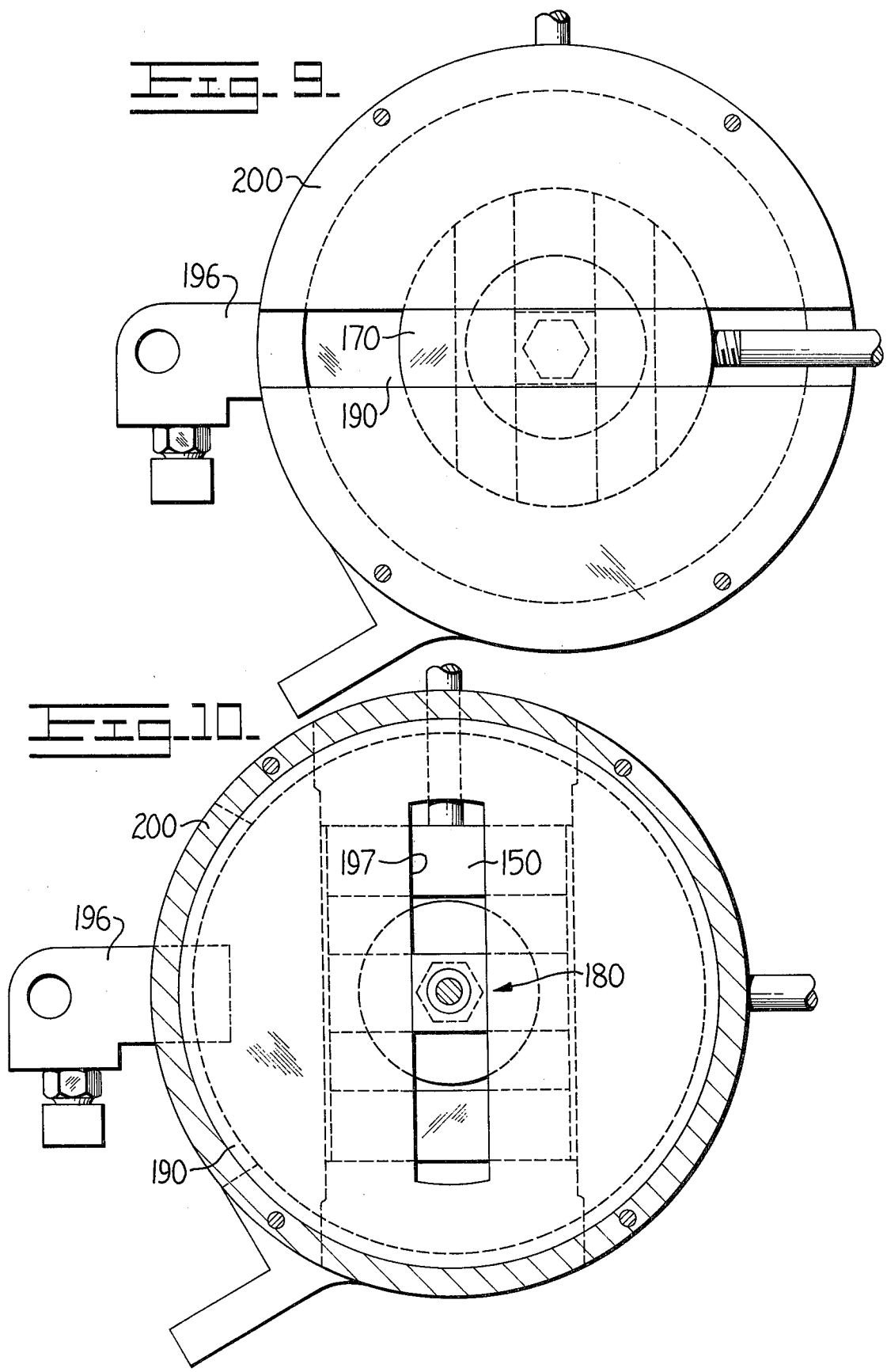

3,927,527

MECHANICAL MULTIPLIER-DESIGN II

BACKGROUND OF THE INVENTION

Hydrostatic drive track-type vehicles typically include a variable displacement hydrostatic pump and motor associated with each track of the vehicle. Steering and speed control of the vehicle is achieved by controlling the displacement of the pumps and motors to selectively drive the vehicle tracks. Such hydrostatic steering and speed control is presently accomplished by employing hydraulic mechanisms to control the displacement of the pumps and motors. Such hydraulic systems are expensive and bulky. They are also unreliable, and make it difficult to obtain satisfactory steering modulation due to the characteristics of the hydraulic cylinders used.

SUMMARY OF THE INVENTION

The present invention provides a mechanical multiplier for mechanically controlling the displacement of the hydrostatic drive pumps of a track-type vehicle. The mechanical multiplier is less expensive, more reliable, and more compact than the hydraulic control mechanisms of the prior art.

The mechanical multiplier has a single mechanical speed control input and a pair of mechanical steering control inputs which are connected to the steering controls of the vehicle. A pair of mechanical outputs are connected to the servos controlling displacement of the drive pumps of the vehicle.

The multiplier mechanism includes a rotating member having an elongated slot provided therein, and pairs of linear sliding members arranged in association with the rotating member, one of each pair of sliding members sliding at right angles to another of each pair of sliding members.

An alternative embodiment includes a single linear sliding member slidable in one direction, and a pair of rotating members and linear sliding members slidable in another direction.

BRIEF DESCRIPTION OF THE DRAWINGS

FIG. 9 is a side view of the mechanical multiplier of FIG. 8; and

FIG. 10 is a side sectional view of the mechanical multiplier of FIG. 8.

DESCRIPTION OF THE PREFERRED EMBODIMENTS

Figure 1:
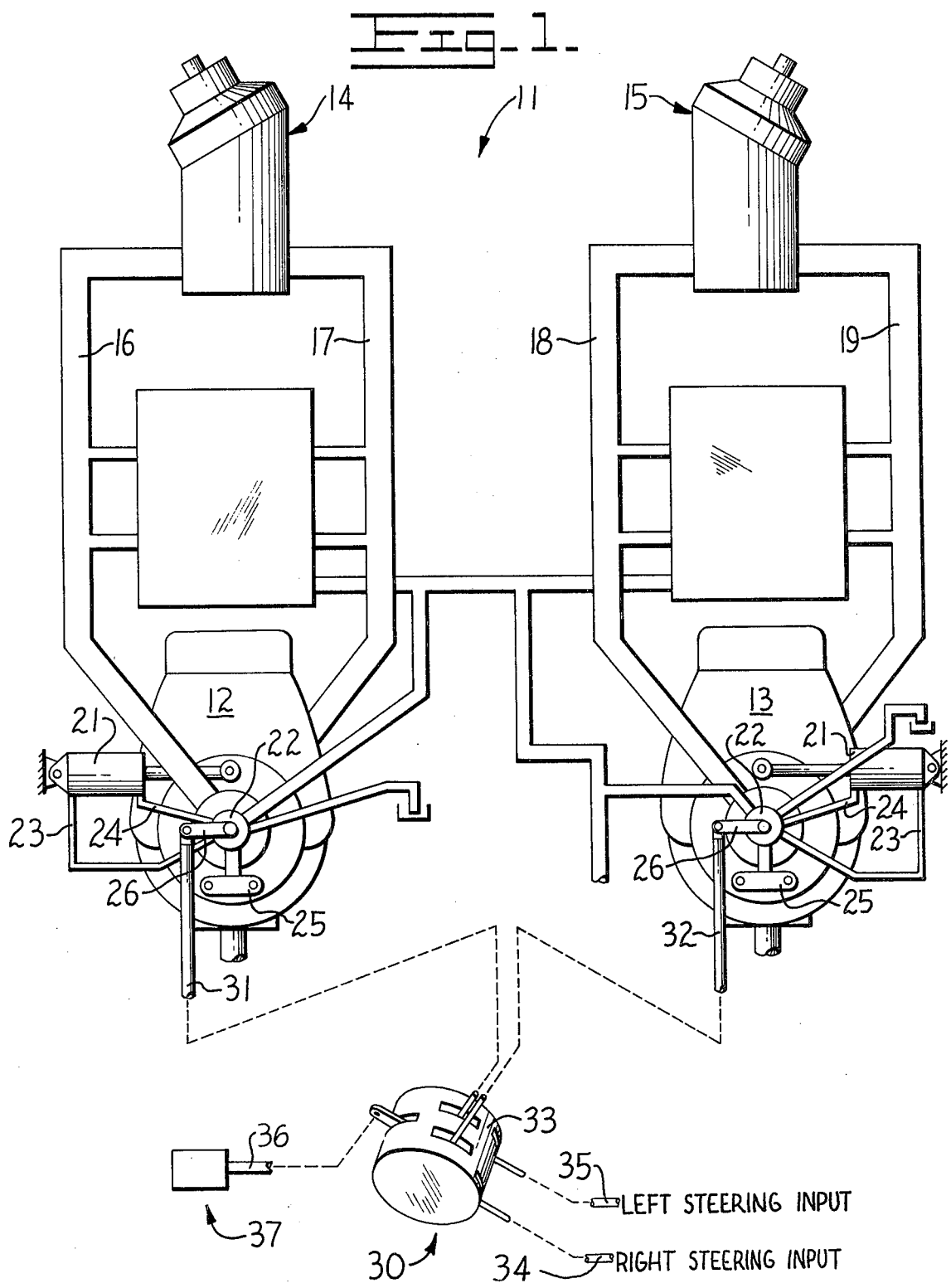
FIG. 1 is a schematic drawing of a hydrostatic drive system for a track-type vehicle.

FIG. 1 illustrates a hydrostatic drive system with which the mechanical multiplier of the present invention may be used as a control mechanism. The drive system for a track-type vehicle or the like comprises a hydrostatic transmission 11 having a pair of variable displacement pumps 12 and 13 connected respectively to a pair of motors 14 and 15, which may also be of the variable displacement type, by pairs of conduits 16, 17 and 18, 19.

Pumps 12 and 13 may be of the axial piston, tilting head or link-type, such as those shown in U.S. Pat. No. 3,381,472 assigned to the assignee of this invention. To change the displacement of the pumps, they are swung on their trunnions by actuators 21. The actuators are controlled by rotary servo valve units 22, which may be similar to those shown in U.S. Pat. No. 1,773,794, through hydraulic lines 23 and 24. Follow-up linkages 25 are connected to the servo units for corresponding the positions of the pumps and servos. The rotary servo valve units are positioned by control arms 26.

A hydrostatic drive system similar to the above described system is shown in U.S. Pat. No. 3,477,225, controlled by a hydraulic mechanism connected to the control arms of the servo valve units.

The present invention provides a mechanical control mechanism shown generally at 30 having output linkages 31 and 32 connected to the servo valve control arms.

The mechanical control mechanism comprises a mechanical multiplier 33 having left and right steering input links 34 and 35 and a speed control input link 36 connected thereto, and controlled by a speed pilot cylinder 37.

Figure 2:
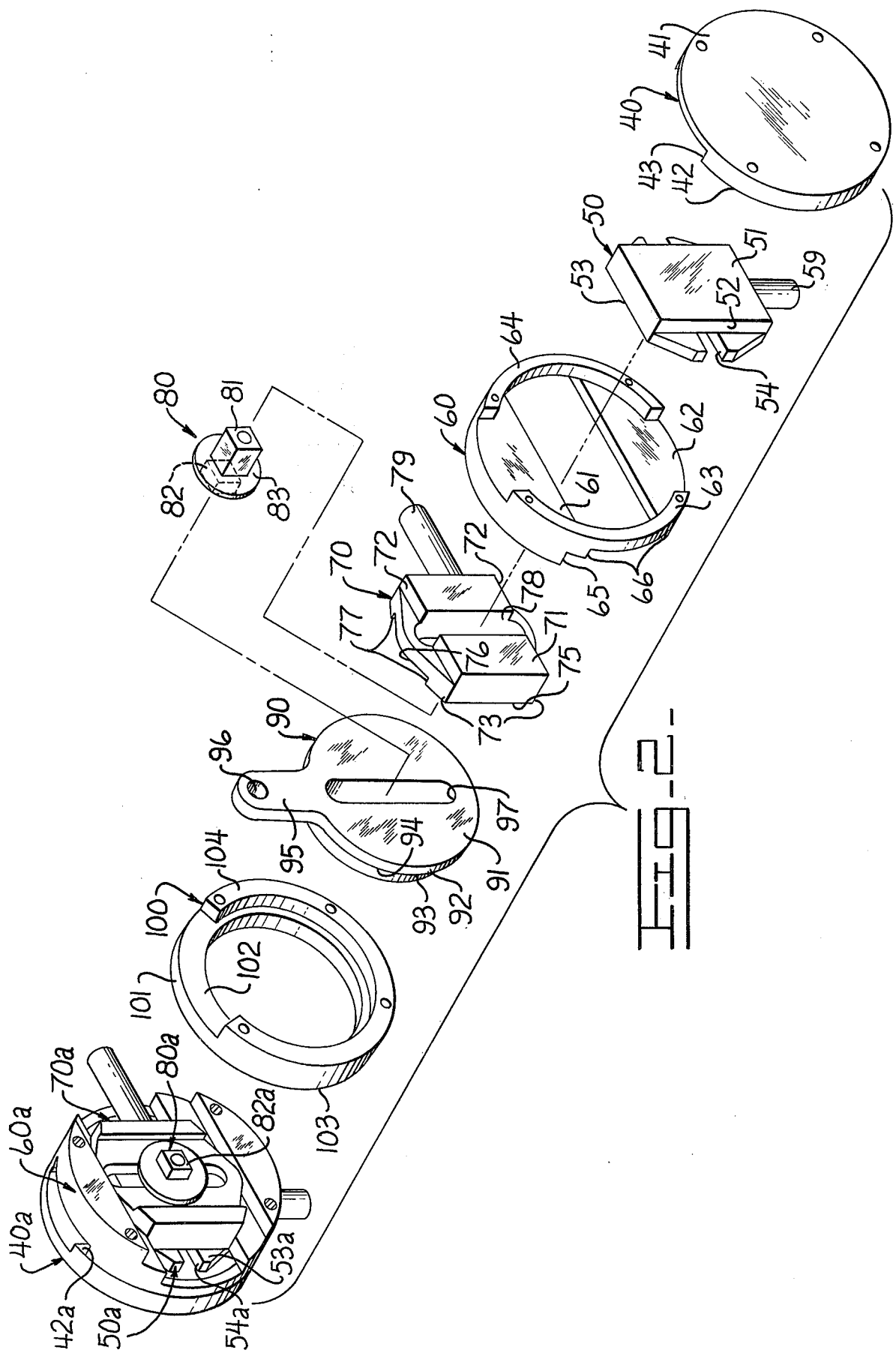
FIG. 2 is an exploded view of the mechanical multiplier of the present invention.
Figure 3:
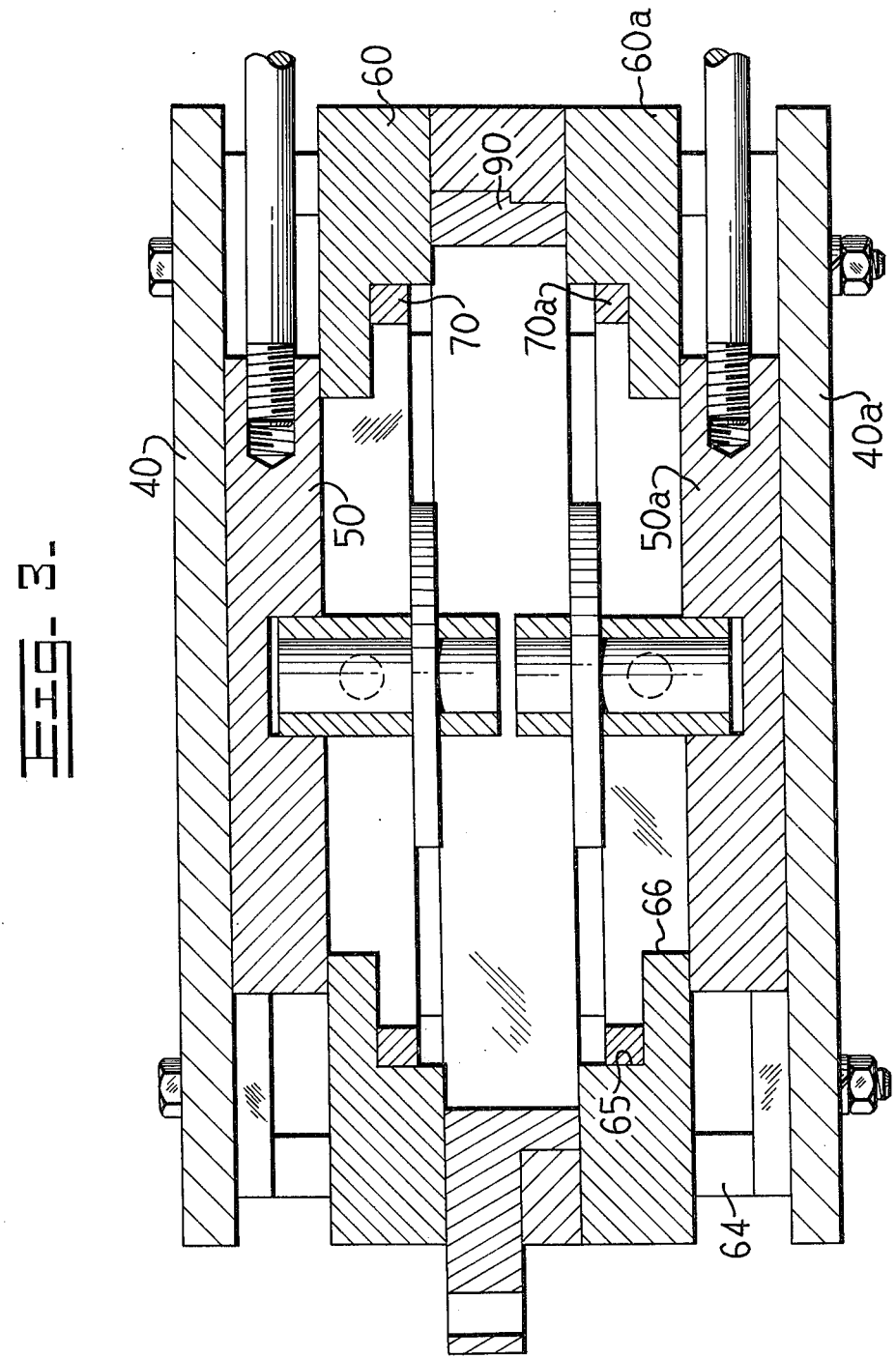
FIG. 3 is a sectional view of the mechanical multiplier of the present invention.

The component parts of the mechanical multiplier, which are illustrated in FIG. 2, comprise a cover 40, a first sliding block 50, a body portion 60, a second sliding block 70, a pin assembly 80, a rotating input head 90 and a journal section 100. A second series of similar components including a cover 40a, a first sliding block 50a, a body portion 60a and a second sliding block 70a, are disposed in reverse order on the other side of journal section 100 to complete the mechanical multiplier.

Cover 40 comprises a flat cylindrical plate having outer and inner faces 41 and 42 respectively. Face 42 includes means forming a wide vertical diametrical slot 43, adapted to receive a portion of sliding block 50.

Sliding block 50 has a face 51 which includes parallel shoulders 52 and is adapted to slide within slot 43 in cover 40. A second face 53 of sliding block 50 includes means forming a horizontal slot 54 therein.

Body portion 60 includes cylinder segments 61 and 62 secured together in parallel spaced relationship by arcuate spacers 63 and 64 which encompass sliding block 50 and abut face 42 of cover 40, spacing the body portion from cover 40. The cylinder segments of body portion 60 have edges 66 which cooperate to form slide ways for second sliding block 70.

Second sliding block 70 has a face 71 which includes shoulders 72 which slide on edges 66 of body portion 60. Top and bottom edges 73 of block 70 are disposed within shoulders 65 of body portion 60. Another face 75 on block 70 has a wide vertical groove 76 formed therein by shoulders 77. A vertical slot 78 extends through the central portion of block 70.

Face 75 abuts a face 91 on rotating input head 90. Input head 90 comprises cylindrically shaped members 92 and 93 in coaxial abutting relationship. The diameter of member 92 is greater than that of member 93, resulting in an annular shoulder 94 at the juncture of the two members. A tab 95 projects from member 92 and is provided with a bore 96 for connection with control link 36. A diametrical slot 97 extends through head 90.

Journal 100 comprises an annular ring 101 having faces 102 and 103. An annular segment 104 is disposed on face 102 coaxial with ring 101. The inside radius of annular segment 104 is slightly greater than the radius of member 92 and the inside diameter of ring 101 is slightly greater than the outside diameter of member 93 so that head 90 mounts rotatably within journal 100.

Pin assembly 80 comprises pins 81 and 82 disposed on each side of a washer 83. Washer 83 is disposed slidably within groove 76 of sliding block 70. Pin 81 projects through slot 78, through body member 60 and into slot 54 in sliding block 50. Pin 82 projects into slot 97.

Assembled components including cover 40, first sliding block 50, body portion 60, second sliding block 70 and pin assembly 80, in conjunction with input head 90 and journal 100, comprise a basic unit of the mechanical multiplier of the present invention. Input head 90 and one of the sliding blocks comprise the mechanical input members, and the other sliding block comprises the mechanical output member. In the present embodiment the two input signals relate to the desired speed and direction of a vehicle transmission.

Where two different sets of input and output signals are desired, as with a track-type vehicle where it is desired to drive each track independently of the other through independent hydrostatic drive systems such as the one illustrated in FIG. 1, a second assembly of components is provided which includes cover 40a, first sliding block 50a, body portion 60a, second sliding block 70a and pin assembly 80a, also in conjunction with the input head 90 and journal 100 and abutting face 103 of journal 100. A pin 82a projects into slot 97 of input head 90.

First sliding block 50 has a link 59 attached thereto by means of which block 50 may be reciprocated vertically within slot 43 of cover 40.

Second sliding block 70 has a link 79 attached thereto be means of which block 70 may be reciprocated horizontally on slides 66 between shoulder 65 of body portion 60. Similar links are attached to blocks 50a and 70a.

Figure 4:
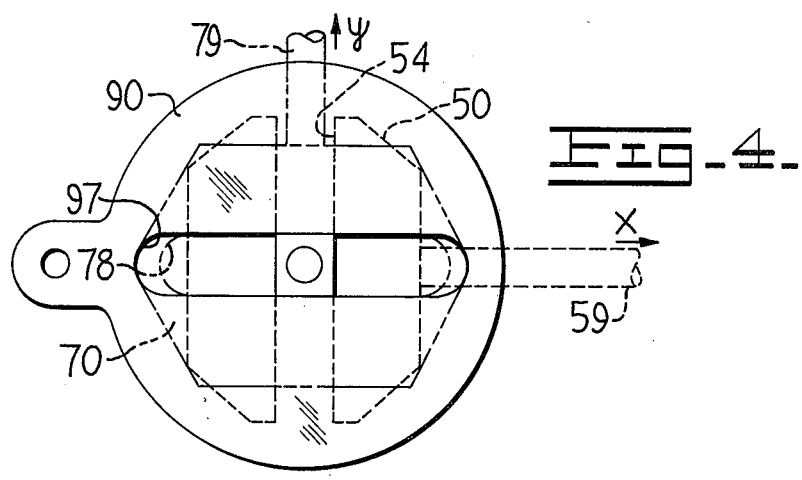
FIG. 4 is a schematic drawing of the mechanical multiplier in a neutral mode.
Figure 5:
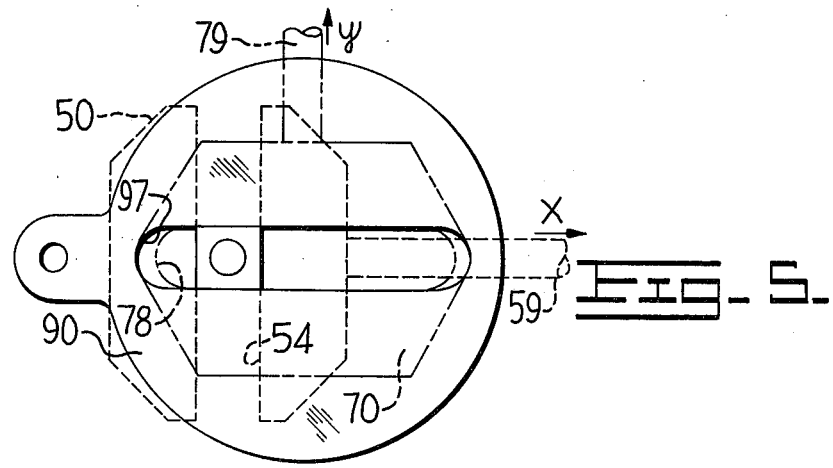
FIG. 5 is a schematic drawing of the mechanical multiplier in a neutral mode with a speed control input.
Figure 6:
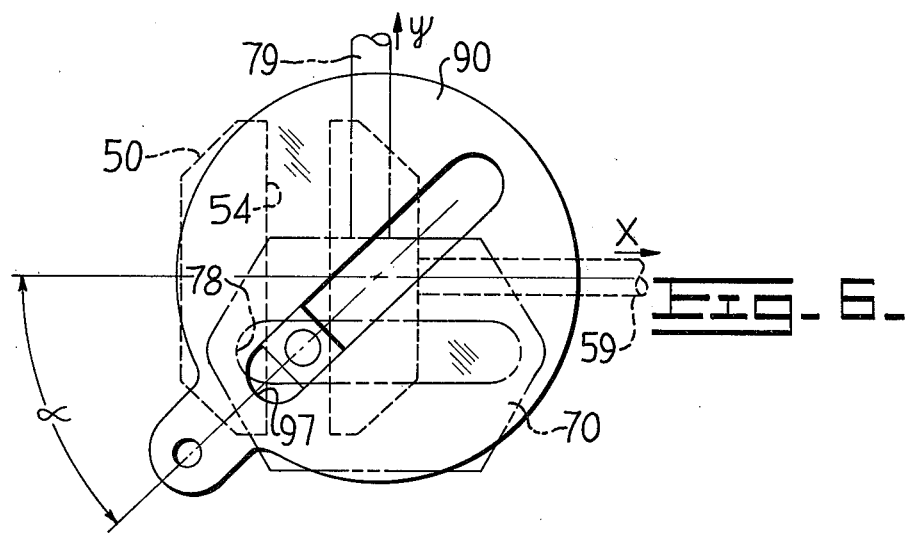
FIG. 6 is a schematic drawing of the mechanical multiplier in a driving mode.

The operation of the basic mechanical multiplier unit of the present invention is illustrated in FIGS. 4, 5 and 6. The multiplier is a mechanical analog computer of the form $y=ax$ or $y=\tan\alpha$, where $\alpha$ is the angle between the slot in head 90 and abscissa. In FIG. 4, link 59 is an input link slidable along an abscissa axis for various values of $x$. Link 79 is an output link slidable along an ordinate axis for various values of $y$. The axes intersect in the center of the multiplier and input head 90. Input head 90, and slot 97 provided therein, are rotatable about the intersection of the abscissa and ordinate axes for various values of $a$, the slope of slot 97.

In FIG. 4, $a$, $x$ and $y$ are all zero. In FIG. 5, input link 59 and first sliding block 50 are shifted leftward for a negative value of $x$. However, $a$ is still zero. Thus, $y$ is also zero and output link 79 has not moved.

In FIG. 6, $a$ is about one. Thus, for an input in link 59 there is a corresponding output in link 79 equal to $ax$.

Since the multiplier will multiply algebraically, it can be used for speed and directional control of a vehicle transmission. The use of a multiplier constructed in accordance with the present invention in a vehicle control system is illustrated schematically in FIG. 7 which shows an alternative embodiment where the sliding surfaces are disposed outside the rotating input head.

A directional control lever 110 is connected through links 111, 112 and 113 to a rotating input head 90' of a mechanical multiplier. The directional control lever and the input head are continuously variable between forward, neutral and reverse operating positions F, N and R as shown.

A deceleration pedal or steering control 115 is connected by a link 116 to first sliding block 50', disposed for sliding in a first direction.

Second sliding block 70' is disposed for sliding in a second direction normal to the first direction, and is connected by a link 117 to the vehicle transmission control linkage.

A pin assembly 80' is disposed mutually in the slots in the first sliding block, the input head and the second sliding block, as previously described.

Second sliding block 70' will follow the movement of pin assembly 80' in the second direction between forward, neutral and reverse transmission operating positions F, N and R as shown. Greater displacement of link 117 from the neutral position in either direction will result in greater displacement of the transmission pump and thus greater speed of the vehicle.

To operate the vehicle, the primary direction desired is selected by shifting the primary direction control lever 110 such as to F for forward as shown.

Decelerator pedal 115 is biased by a spring 118 to keep first sliding block 50 shifted to its upper extreme operating limit as shown. When the multiplier is in the configuration, pin assembly 80' will cause second sliding block 70' to be shifted to its extreme left operating position as viewed in FIG. 7, which is a fast forward transmission mode.

Figure 7:
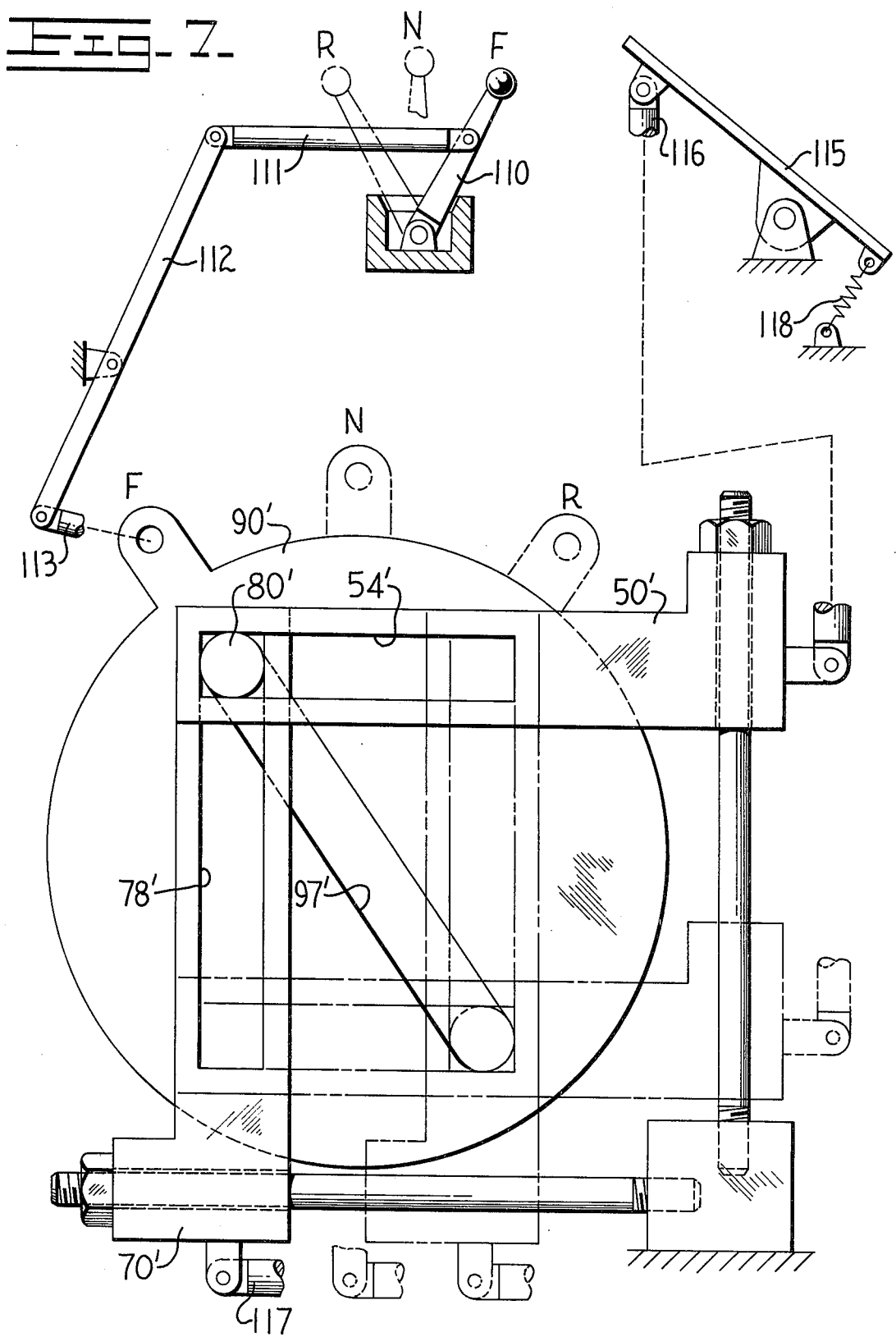
FIG. 7 is a schematic drawing of an alternative embodiment of the mechanical multiplier of the present invention.

As the deceleration pedal is depressed, sliding block 50' will move downward, as viewed in FIG. 7. Pin assembly 80' will be moved downward by slot 54' and rightward by slot 97', as viewed in FIG. 7, shifting second sliding block 70' to the right, decreasing the displacement of the vehicle's hydrostatic drive pump and slowing the vehicle.

As the decelerator pedal is depressed further, the first sliding block, the pin assembly and the second sliding block will be moved to the center of the multiplier, where the hydrostatic drive pump displacement will be zero and the transmission will be in neutral.

As the decelerator pedal is depressed still further, the first sliding block will continue to move downward, moving the pin assembly and the second sliding block even further to the right as the pin assembly follows the intersection of slots 54' and 97'. This further movement of second sliding block 70' and link 117 will cause the vehicle's hydrostatic drive pump to reverse and drive the vehicle in reverse. Greater displacement of link 117 from the neutral position will effect greater reverse displacement of the pump and faster reverse vehicle speed.

It will be apparent to those skilled in the art that for a crawler type vehicle having a separate hydrostatic drive system for each track, as shown in FIG. 1, another first sliding block may be added, as previously described (FIG. 2), along with a second decelerator pedal. The primary vehicle direction is then selected with the direction control lever 110, and the vehicle tracks may be driven selectively in forward or reverse by manipulation of the respective deceleration pedals.

Alternatively, the deceleration steering pedals may be replaced by a steering wheel.

The output of the mechanical multiplier will be linear with respect to the first sliding block and nonlinear with respect to the input head. A double mechanical multiplier having two linear input sliding blocks and a single input head has been previously described and illustrated (FIG. 2). As shown in FIG. 7, when this arrangement is employed, the primary speed control is connected to the input head, and thus is non-linear.

Figure 8:
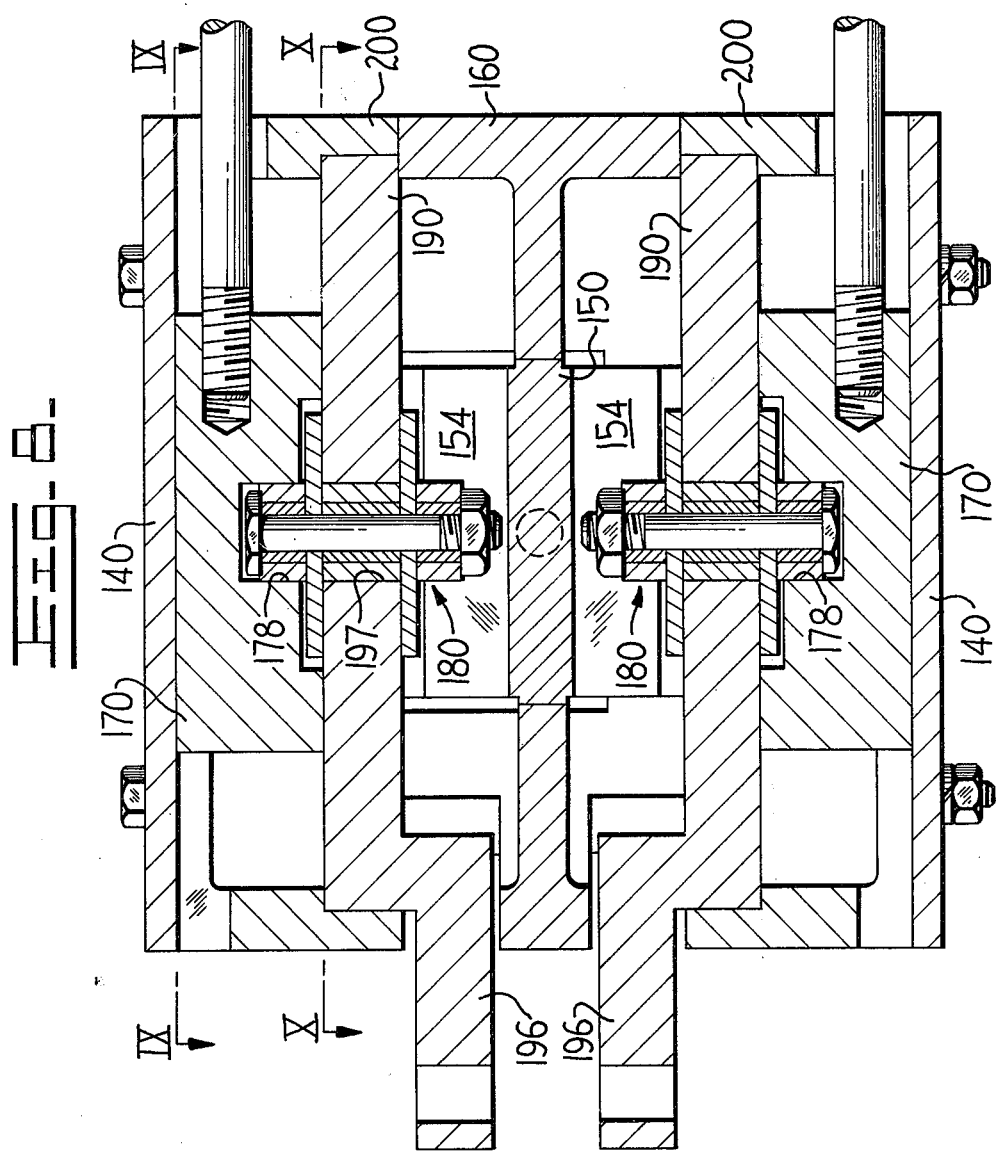
FIG. 8 is a sectional view of another embodiment of the present invention.

If it is desired to have a linear speed input signal, (and two non-linear steering signals), a double mechanical multiplier may also be constructed by employing a single first sliding block and placing a rotating input head and a second sliding block on each side thereof. The construction of this embodiment is illustrated in FIGS. 8, 9 and 10.

A first sliding block 150 is slidable within a body 160 and has slots 154 provided on each side. A rotating input head 190 having a slot 197 and a control tab 196 is disposed on each side of sliding block 150 within a journal member 200.

Further adjacent each input head is a second sliding block 170 having a slot 178 provided therein. End covers 140 retain blocks 170 against the rotating heads. Pin assemblies 180 similar to pin assemblies 80 previously described, ride in slots 154, 197 and 178.

This embodiment is preferred where a single linear speed input is desired. A speed input link is attached to first sliding block 150. Left and right steering inputs are then attached to each of the rotating input heads. Sliding blocks 170 will then provide an output signal for each vehicle transmission.

I claim:
1. A mechanical multiplier mechanism comprising,
   a linearly movable input member slidable along a first line and including means forming a linear slot therein normal to said first line,
   a cylindrical rotatable input member including means forming a diametrical slot therein,
   a linearly movable output member slidable along a second line normal to said first line, and including means forming a linear slot therein normal to said second line, and
   pin assembly means disposed mutually in all of said slots.
2. The multiplier mechanism of claim 1 further comprising,
   a second linearly movable input member slidable along a line parallel to said first line, and having means forming a linear slot therein parallel to the slot in said first linearly movable input member,
   a second linearly movable output member slidable along a line parallel to said second line, and having means forming a linear slot therein parallel to the slot in said first linearly movable output member, and,
   a second pin assembly mutually disposed in the diametrical slot in the rotatable input member and the slots in the second linearly movable input member and the second linearly movable output member.
3. The multiplier mechanism of claim 1 further comprising,
   a second cylindrical rotatable input member having means forming a diametrical slot therein,
   a second linearly movable output member slidable along a line parallel to said second line and having means forming a linear slot therein parallel to the slot in said first linearly movable output member, and,
   a second pin assembly mutually disposed in the linear slot in the linearly movable input member, the linear slot in the second linearly movable output member and the diametrical slot in the second cylindrical rotatable input member.
4. The multiplier mechanism of claim 1 in combination with a vehicle having a transmission including a hydrostatic drive, variable displacement, reversible pump and control linkage for controlling the displacement and direction of the pump, a speed control means and a direction control means, and wherein the speed control means is connected to one of said linearly movable input member and said rotating input member, and the direction control means is connected to the other of said members, and the linearly movable output member is connected to the hydrostatic drive pump control linkage.
5. The multiplier mechanism of claim 2 in combination with a vehicle having a transmission system including two hydrostatic drive variable displacement reversible pumps and control linkages for controlling the displacement and direction of said pumps, and a speed control means and a direction control means for each of said pumps, and wherein the speed control means is connected to the rotatable input member and the direction control means are connected respectively to the first and second linearly movable input members, and the first and second linearly movable output members are connected respectively to the control linkages for said pumps.
6. The multiplier mechanism of claim 3 in combination with a vehicle having a transmission including two hydrostatic drive variable displacement reversible pumps and control linkage for controlling the displacement and direction of said pumps, and a speed control means and direction control means for each of said pumps, and wherein the speed control means is connected to the linearly movable input member and the direction control means are connected respectively to the first and second rotatable input members, and the first and second linearly movable output members are connected respectively to the control linkages for said pumps.

* * * * *